United States Patent [19]

McKee

[11] Patent Number: 4,926,622
[45] Date of Patent: May 22, 1990

[54] COMBINED ROTARY CUTTER AND HERBICIDE APPLICATOR AND METHOD

[76] Inventor: Robert L. McKee, Rte. 1, Box 138, Maynard, Ark. 72444

[21] Appl. No.: 331,823

[22] Filed: Apr. 3, 1989

[51] Int. Cl.⁵ ............... A01C 15/00; A01D 34/82
[52] U.S. Cl. .................... 56/16.8; 56/295; 56/DIG. 5; 83/169
[58] Field of Search .......... 56/16.8, DIG. 5, 295, 56/255; 83/169

[56] References Cited

U.S. PATENT DOCUMENTS

| | | | |
|---|---|---|---|
| 2,878,633 | 3/1959 | Mullin | 56/16.8 |
| 2,908,444 | 10/1959 | Mullin | 56/16.8 X |
| 3,090,187 | 5/1963 | Livingston | 56/16.8 X |
| 3,332,221 | 7/1967 | McCain | 56/295 |
| 3,942,308 | 3/1976 | Vicendese et al. | 56/16.8 |
| 4,870,946 | 10/1989 | Long et al. | 83/169 X |

Primary Examiner—Jerome W. Massie
Assistant Examiner—David J. Bagnell
Attorney, Agent, or Firm—Polster, Polster and Lucchesi

[57] ABSTRACT

In a rotary brush cutter with a rotating shaft, a plurality of cutting blades extending substantially radially from the shaft and a drive for rotating the shaft, herbicide is fed adjacent a cutting portion of the blades while the blades are rotated whereby the herbicide is applied to brush being cut.

10 Claims, 2 Drawing Sheets

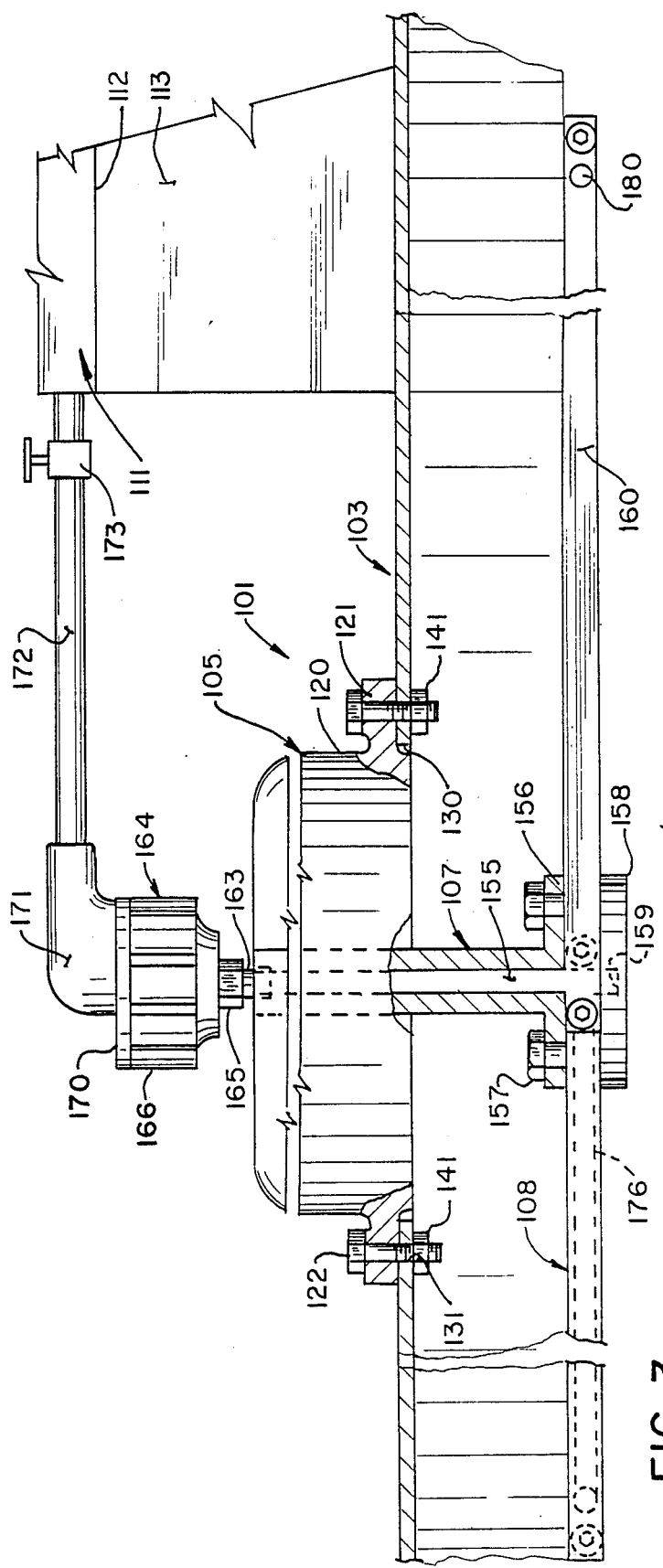
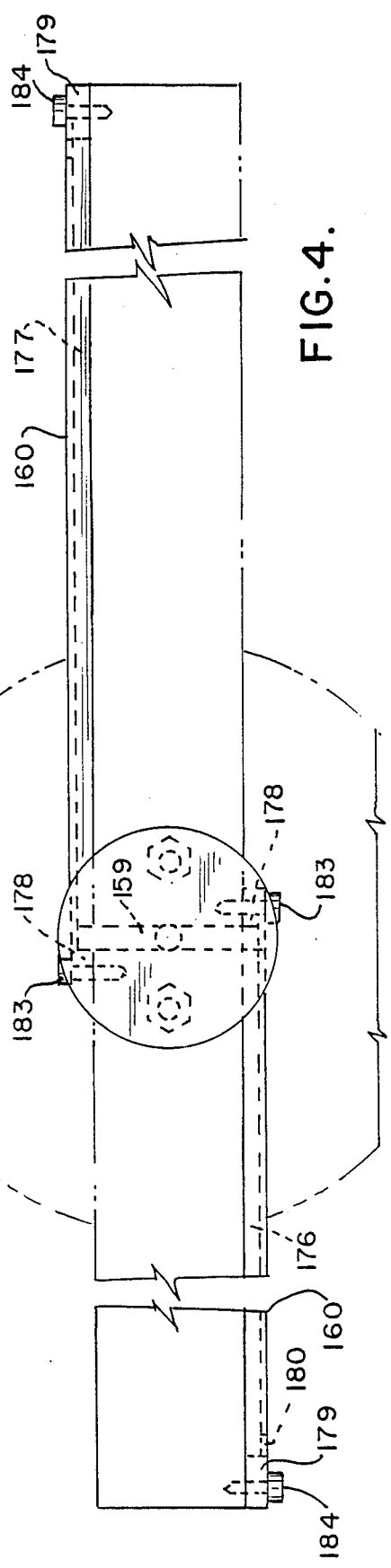
FIG. 3.
FIG. 4.

COMBINED ROTARY CUTTER AND HERBICIDE APPLICATOR AND METHOD

BACKGROUND OF THE INVENTION

In clearing land of heavy brush as must be done for utility lines, ditches and berm along many rural roads, and even neglected fields, heavy rotary brush cutters with massive blades, mounted on and driven from the power take-off of a tractor, are frequently used. Although these brush cutters are very efficient, cutting even small trees, the brush soon sprouts from the roots that remain, and the process has to be repeated. This is expensive and time consuming. Spraying of the cut brush with a herbicide has heretofore entailed a separate operation, and the spraying itself has been somewhat dangerous to the operator because of the fog of herbicidal droplets, that is created, and not always as well controlled with respect to surrounding uncut vegetation as desired.

One of the objects of this invention is to provide equipment and a method of using it by which herbicide is applied to the cut brush immediately as it is being cut, in such a way as to minimize fogging and misapplication of the herbicide, in an efficient and economical way.

Other objects will become apparent to those skilled in the art in the light of the following description and accompanying drawing.

SUMMARY OF THE INVENTION

In accordance with this invention, generally stated, a rotary brush cutter is provided with means for feeding herbicide to a cutting portion of the blades of the brush cutter while the blades are rotated, whereby the herbicide is applied immediately to brush being cut. In the preferred embodiment, a reservoir is mounted on the housing of the brush cutter and feeds herbicide, through a metering valve, to a distributing cup, hence, through conduit extending lengthwise of the blades, to one or more ports at the area or areas in which distribution of the herbicide is desired. The herbicide is preferably in the form of a gel or grease the viscosity of which is controlled so as largely to eliminate any fogging or dispersal outside the area under the housing of the brush cutter.

BRIEF DESCRIPTION OF THE DRAWINGS

In the drawing.

FIG. 3 is a fragmentary view in side elevation, partly in section and partly broken away, showing a second embodiment of combination rotary brush cutter and herbicide applicator of this invention; and FIG. 4 is a bottom plan view of the device shown in FIG. 3.

DESCRIPTION OF PREFERRED EMBODIMENTS

Figure 1:
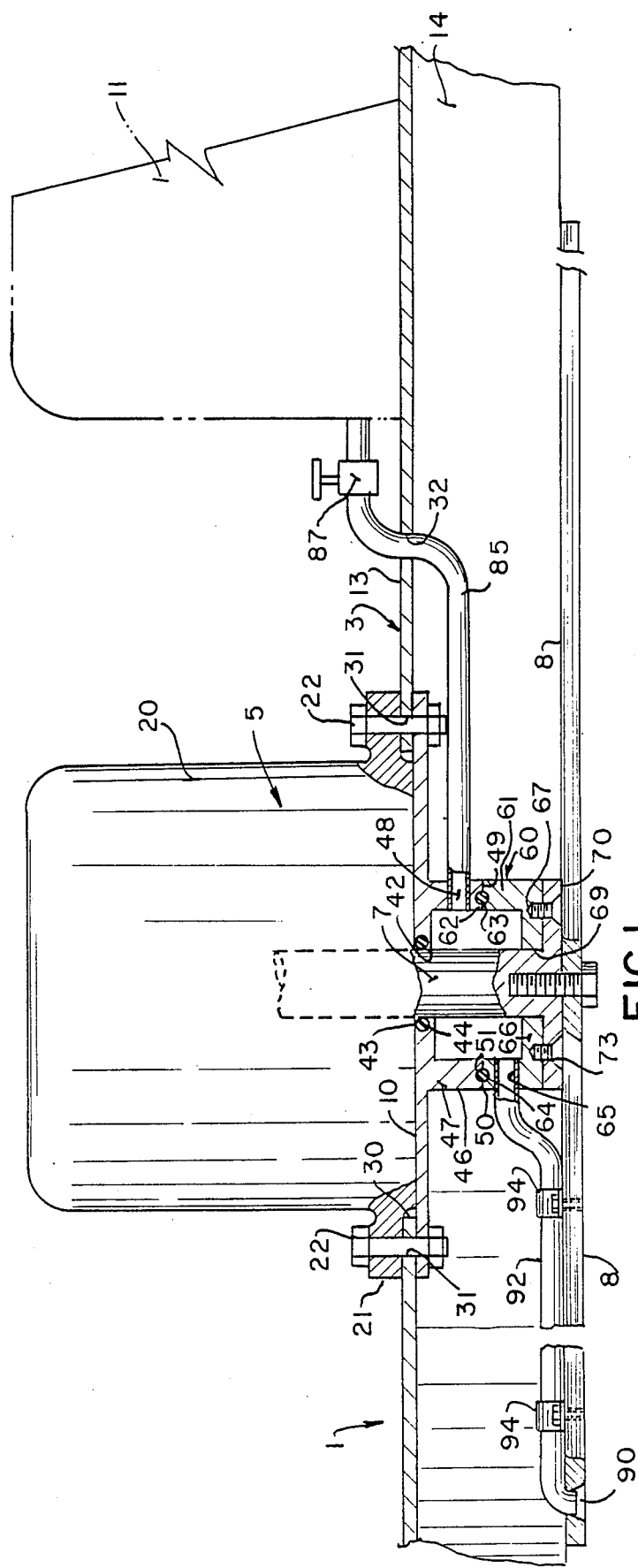
FIG. 1 is a fragmentary, somewhat schematic view in side elevation, partly in section and partly broken away, of one illustrative embodiment of combination brush cutter and herbicide applicator of this invention.
Figure 2:
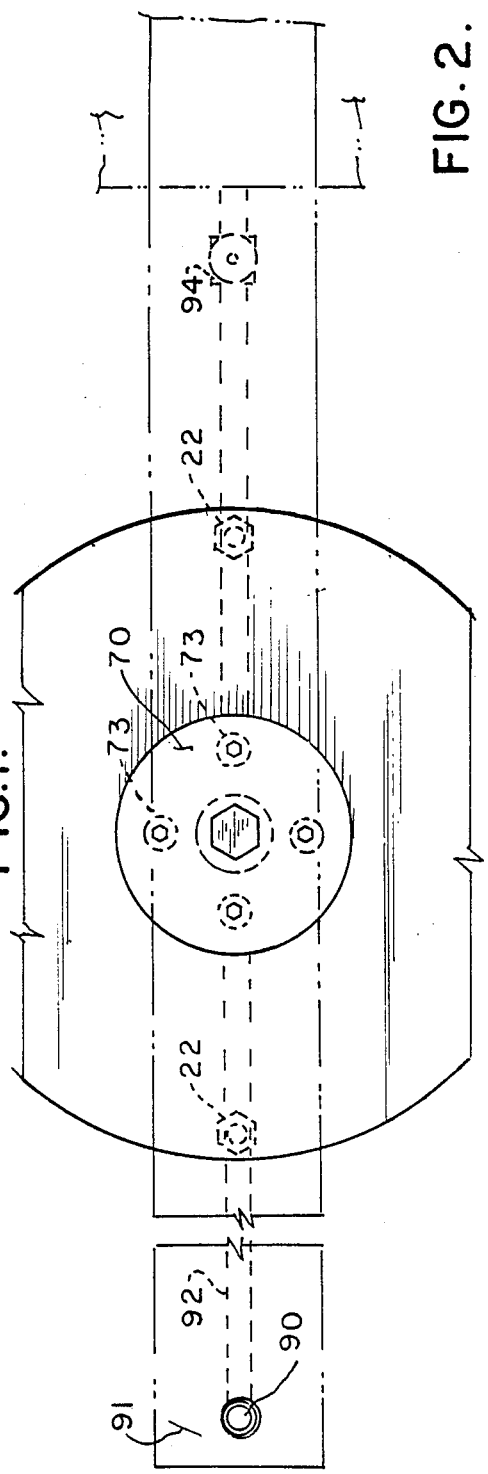
FIG. 2 is a fragmentary bottom plan view of the device shown in FIG. 1.

Referring now to FIGS. 1 and 2 of the drawing for one illustrative embodiment of the combination rotary brush cutter and herbicide applicator of this invention, reference numeral 1 indicates a rotary cutter, with a housing 3, a power source 5 rotating a shaft 7, and blades 8 (in the embodiments shown, a single straight piece connected at its center to the shaft and projecting diametrically from it to provide leading and trailing edges on opposite sides of what are effectively two blades), connected to the shaft 7 for rotation therewith. Except for modification of the blades, these elements can be conventional.

The housing 3 has a substantially flat top wall 13 and the usual skirt 14 depending from it. A reservoir 11 is mounted on the outer surface of the upper wall 13. The upper wall 13 has a central opening 30 around which bolt holes 31 are symmetrically arranged, and a feed tube hole 32.

The power source 5, which, in this embodiment can be either an internal combustion engine or a gear box designed to be connected to a power take off of the vehicle on which the rotary cutter is mounted, has a case 20 with a radially extending flange or ears 21, provided with bolt holes coinciding with bolt holes 31, through which bolts 22 extend. The bolts 22 extend through bolt holes in a mounting plate 10, positioned with its upper surface against the under surface of the upper wall 13 of the housing. The mounting plate 10 has a central shaft passage 42, with an annular seat 43 in which an O-ring 44 is seated. The mounting plate has, depending from and integral with its undersurface, a collar 46, concentric with the axis of the passage 42. The collar 46 has a circumferential wall 47 with a passage 48 extending radially through it, and a lower planar surface 49 with an annular seat 50 in which an O-ring 51 is seated.

A cup 60 is mounted on the lower end of the shaft 7. The cup 60 has a circumferential wall 61 and a planar upper surface 62 with a seat 63 complementary to the seat 50, which receives a lower half of the O-ring 51. The side wall 61 has a feed passage 65 extending radially through it, and positioned contiguous an upper surface of a bottom wall 66 integral with the circumferential wall 61.

Blind tapped bolt holes 67 extend into the bottom wall 66, opening through its lower surface. The bottom wall has a central shaft receiving opening 69 coaxial with the central shaft passage 42. A shaft hub 70 is shown as integral with the shaft 7. The shaft hub has a flange through which bolt holes complementary to the bolt hole 67 extend, to receive bolts by which the cup is secured to the shaft. The blade 8 is mounted to the shaft 7, below the hub 70, with a blade retaining bolt, in the conventional way.

A feed tube 85 is connected at one end to communicate with the interior of the reservoir 11, and at another end to the radial passage 48 in the collar 46. A metering and shut-off valve 87 is mounted intermediate the ends of the feed tube 85, between the reservoir 11 and the tube hole 32 through which the tube 85 goes, as shown in FIG. 1.

In this embodiment, a herbicide port 90 extends through the broad dimension of the blade near its outer, cutting area 91. As indicated by wear patterns, most of the cutting of such a blade is done near its radially outermost edge. A herbicide conduit 92 communicates at one end with the feed passage 65 of the cup 60, and at its other, with the herbicide port 90, as shown in FIGS. 1 and 2. Clamps 94, bolted to the upper side of the blade 8, hold the herbicide conduit 92 in place.

In use, viscous herbicide is put into the reservoir 11 while the valve 87 is closed. When the device is about to be used, the valve 87 is opened to the extent that it supplies the herbicide in the amount required, and the herbicide runs into the cup 60. The shaft 7 is caused to rotate, rotating the cup 60 and the herbicide conduit 92, as well as the blade 8. The centrifugal force generated by the revolving conduit 92, applied to the herbicide in the cup 60, causes the herbicide to move through the conduit 92 and out the port 90, thence along the underside of the blade 8 in the cutting area 91.

The herbicide port 90 is positioned and configured in such a way as to permit the spread of the herbicide on the cutting area of the blade effectively for the expected tip velocity of the blade and its particular configuration. The port 90 can take the form of a plurality of ports, either spaced radially, or circumferentially, or both. The viscosity of the herbicide can be adjusted to give the desired coverage of the blade without excessive atomization of the herbicide. Merely by way of example, glyphosate (the monomethylphosphate isopropylamine salt of N-(Phosphonomenthyl) glycine, sold commercially by Monsanto Company under the trademark ROUNDUP, is water-compatible and can be formulated as a gel with a viscosity like that of a heavy oil. It also, however, can be formulated in a grease or in a thick water-in-oil emulsion form to accomplish the same result. Other herbicides can be formulated similarly.

Referring now to FIGS. 3 and 4 for a second embodiment, reference numeral 101 indicates a rotary cutter with a housing 103, and a power source 105 mounted to the housing 103 in a way similar to that of power source 5 of the first embodiment. The cutter has a shaft 107 projecting entirely through the power source, and a blade 108 mounted on the lower end of the shaft 107. A reservoir 111 is mounted on an upper surface of the housing 103. The reservoir 11 differs from the reservoir 11 in that a bottom wall 112 on the reservoir is elevated above the upper surface of the housing 103 by a base or stand 113 that is secured to the top of the housing.

The power source 105 has a case 120, with a flange for ears 121 through which bolts 122 extend, passing through bolt holes 131 in the housing 103 against an under surface of which nuts 141 are drawn tightly to mount the case 120 to the housing 103.

In this embodiment, the shaft 107 has an axial shaft passage 155 extending entirely through it on the axis of rotation of the shaft. At its lower end, the shaft 107 has a hub or flange 156 with suitable bolt holes, not here shown, to receive bolts 157. A lower shaft plate 158 has tapped bolt holes to receive the threaded shanks of the bolts 157. The lower shaft plate 158 has a diametrically extending channel 159, ending short of the outer edge of the plate at each end. The channel 159 communicates at its center with the lower end of the shaft passage 155, and at its two outer ends with channels 176 and 177 in distributor bars 160.

The upper end of the shaft 107 is counterbored and tapped to receive a nipple 163 on which a cup 164 is mounted by means of an internally threaded boss 165 with a passage extending through it and communicating with the interior of the cup 164. The cup 164 has a side wall 166 with a planar upper surface on which a cover 170 is mounted in fluid tight but slidable contact, permitting the cup 164 to rotate relative to the cover 170. An elbow 171 fixedly secured to the top surface of the cover 170 has in it a passage communicating through an opening in the cover 170, with the interior of the cup 164. A feed tube 172 with the same sort of metering and shut-off cock 173 as the cock or valve of the first embodiment, communicates at one end with the passage in the elbow 171 and, at its other end, with the interior of the reservoir 11

The bars 160 are of the same height-wise thickness as the blades 108 and are mounted to the blade on the trailing edges of the blade on diametrically opposite sides of the shaft 107 by means of studs 183 and 184 extending through solid end sections 178 and 179 of the bars, as shown particularly in FIG. 4. The studs 183 extend into tapped blind holes in the edge of the blade. At their radially inner ends, the lower wall defining the channels 176 and 177 of the bars is cut away to coincide with the shaft plate channel 159, so that the channels 176 and 177 communicate by way of the channel 159 and shaft passage 155, with the interior of the cup 164. In the embodiment illustrated, distributing ports 180 are shown as extending in a direction transverse to the long axis of the blade. However, the ports 180 can be directed downwardly, and a plurality of ports can be provided.

In the operation of this embodiment, herbicide is put in the reservoir 111, the metering cock 173 is adjusted to provide proper flow, the blade 109 is caused to rotate by the rotation of the shaft 107, and centrifugal force pulls the herbicide from the cup, through the passage 107, cross passage 159 and channels 176 and 177 to the ports 180 where it is discharged.

In either embodiment, the reservoir can be pressurized to insure that the viscous herbicide reaches the cup.

Because the herbicide is dispensed in the cutting area of the blade, it coats the freshly cut vegetation as it is cut. At the same time, because of the high viscosity of the herbicide and the relatively small amount that needs to be used because of the efficacy of its application, there is little or no aerosol disbursement of the herbicide, so that its application is confined narrowly to the vegetation being cut, and the operator is not exposed to a fog of herbicide. By the use of the apparatus, the frequency with which brush must be cleared from various rights of way, or from fields that might otherwise be overgrown with brush after a short time, is much reduced.

The cup of both embodiments and the cover (the collar and mounting plate wall of the first embodiment constituting a cover) make up a distributor manifold.

Numerous variations in the construction and method of this invention will be apparent to those skilled in the art in the light of the foregoing disclosure. Merely by way of illustration and not of limitation, a different number of blades, as, for example three or four, can be used, each of which can be equipped with a herbicide dispensing port or ports, or the dispensing mechanism can be applied to less than all of the blades. The bars 160 of the second embodiment can be positioned on the leading edge of the blades, ending substantially short of the effective cutting area of the blade tips, but being ported downwardly so as to distribute the herbicide across the bottom surface of the blade along which centrifugal force will move the herbicide into the cutting area. In the first embodiment, the ports 90 can be positioned asymmetrically with respect to the blade toward the leading edge, to accomplish much the same thing. Different design configurations of the manifolds and means for introducing the herbicide to the cups can be provided. The reservoir can be carried by something besides the housing of the cutter. Although the device has been described as being used on a massive brush cutting machine, it can be sized and adapted to use with lighter weight cutters or motors. These are merely illustrative.

Having thus described the invention, what is claimed and desired to be secured by Letters Patent is:

1. In a rotary vegetation cutter with a rotating shaft, a plurality of cutting blades extending substantially radially from said shaft and power means for rotating said shaft, the improvement comprising means for feeding herbicide adjacent a cutting portion of at least one of said blades while said blades are rotated, whereby said herbicide is applied to vegetation as it is cut, said herbicide feeding means including a reservoir for said herbicide, a distributor manifold concentric with said shaft, tube means from said reservoir to said manifold, and feed conduit means from said manifold to port means opening along at least one of said blades radially inboard of a radially outer end of said blade, said distributor manifold including a cup mounted on and around said shaft adjacent said blade for rotation therewith, a collar fixed against rotation axially above said cup, and seal means between said cup and said collar, said tube means communicating with the interior of said collar and said feed conduit means communicating with the interior of said cup.

2. The improvement of claim 1 wherein said feed conduit means extends over an upper surface of said blade and opens into an aperture through said blade to the lower side thereof.

3. The improvement of claim 1 wherein the herbicide is plasticly viscous but not free-flowing, and said reservoir is pressurized.

4. The improvement of claim 1 including metering and shut-off valve means in said tube means.

5. In a rotary vegetation cutter with a rotating shaft, a plurality of cutting blades extending substantially radially from said shaft and power means for rotating said shaft, the improvement comprising means for feeding herbicide adjacent a cutting portion of at least one of said blades while said blades are rotated, whereby said herbicide is applied to vegetation as it is cut, said herbicide feeding means including a reservoir for said herbicide, a distributor manifold concentric with said shaft, tube means from said reservoir to said manifold, and feed conduit means from said manifold to port means opening along at least one of said blades radially inboard of a radially outer end of said blade, said shaft having an axial passage opening through its upper end and communicating at its lower end with said feed conduit means, said distributor manifold including a cup mounted on the upper end of said shaft, said cup having an opening communicating with said shaft passage, and cup cover means fixed against rotation with said cup and having an opening through it communicating with said feed tube and with the interior of said cup.

6. The improvement of claim 5 wherein said feed conduit means includes a passage along a trailing edge of at least one of said blades and the lower end of said shaft passage communicates with said trailing edge passage.

7. The improvement of claim 6 wherein said feed conduit means includes a distributor bar with a channel in a side contiguous said blade trailing edge, said channel ending short of both ends of said bar, and at least one port, through said bar, communicating with said channel.

8. The improvement of claim 5 wherein the herbicide is plasticly viscous but not free-flowing, and said reservoir is pressurized.

9. The improvement of claim 5 including metering and shut-off valve means in said tube means.

10. In the method of killing plants by cutting said plants with a rotary cutter having a plurality of rotating blades and concurrently applying a herbicide to the cut plants by dispensing herbicide adjacent a cutting surface of at least one of said cutting blades, the improvement comprising providing a pressure-tight reservoir for said herbicide, a cup mounted on a blade-rotating shaft for rotation therewith from which said herbicide is dispensed to said blades, said cup having a cover means fixed against rotation axially above said cup, and tube means connected between and communicating with the interior of said reservoir and said cup through said cover means, introducing to said reservoir a plasticly viscous but not free-flowing herbicide, and pressurizing said reservoir, forcing said herbicide under pressure through said tube means from said reservoir into said cup, and moving said herbicide, assisted by centrifugal force, from said cup, through conduit means, through at least one port along a surface of at least one of said cutting blades.

* * * * *